United States Patent [19]

Loposer

[11] 4,276,550
[45] Jun. 30, 1981

[54] SCAN PATTERN ESTIMATOR FOR AN ELECTROMAGNETIC SENSOR

[75] Inventor: Thomas L. Loposer, Greenville, Tex.

[73] Assignee: E-Systems, Inc., Dallas, Tex.

[21] Appl. No.: 973,565

[22] Filed: Dec. 27, 1978

[51] Int. Cl.³ .................................................. G01S 1/02
[52] U.S. Cl. ......................... 343/100 CL; 343/17.1 R; 343/100 LE
[58] Field of Search .................. 343/17.1 R, 100 CL, 343/100 LE

[56] References Cited

U.S. PATENT DOCUMENTS

| 2,487,995 | 11/1949 | Tucker ...................... 343/100 CL X |
| 3,422,435 | 1/1969 | Cragon et al. .................. 343/17.1 R |
| 3,531,802 | 9/1970 | Brown et al. .................... 343/17.1 R |

Primary Examiner—T. H. Tubbesing

Attorney, Agent, or Firm—Robert V. Wilder; Albert M. Crowder, Jr.

[57] ABSTRACT

A scan pattern estimator is used in a scanning electromagnetic sensor system in which electromagnetic radiation is repetitively scanned and sensed for a plurality of scan cycles. The first incoming scan pattern is transmitted to a summer (42) that produces an output scan pattern in response thereto. A delay unit (46) receives and delays the output scan patterns for a period of one scan cycle. The output of the delay unit (46) is multiplied with incoming scan patterns in a multiplier (38). The output of the multiplier (38) is applied to the summer (42). The output of the delay (46) is also applied to the summer (42). Thus, the output of the summer (42) represents a scan pattern estimate of incoming scan patterns with reduced pertubations and interference relative to the incoming scan pattern.

23 Claims, 9 Drawing Figures

SCAN PATTERN ESTIMATOR FOR AN ELECTROMAGNETIC SENSOR

TECHNICAL FIELD

The present invention relates to processing of signals produced by a scanning electromagnetic sensor, and particularly relates to a scan pattern estimator for providing an estimate of a phenomena that is repetitively sensed by an electronic sensor scanning through a scan cycle.

BACKGROUND OF INVENTION

Numerous types of electromagentic sensors repetitively scan through a scan pattern to repetitively sense or examine a particular electromagnetic phenomena. Usually, the electromagnetic sensing equipment and processing equipment are used to recognize, measure and transmit information regarding the phenomena being sensed. The repetitive scanning or sensing may be related to a repetitious time interval or repetitious movement of some portion of the electromagnetic sensor. However, the repetitive sensing may be related to some other repetitious quantity of a specific type of electromagnetic sensor.

Frequency scanning receivers repetitively scan portions of the electromagnetic frequency spectrum while searching for the presence of electromagnetic energy radiated from a radio or radar transmitter. Searching and tracking radar systems often repetitively scan a particular spatial area or volume to detect radar signals that are transmitted or reflected by the phenomena to be sensed. Also, certain types of direction finding sensors repetitively scan a spatial volume to detect electromagnetic energy and to determine the direction of arrival of such energy. The above sensors are examples of electromagnetic sensors that repetitively scan through a scan cycle to examine an electromagentic phenomena.

Energy which is sensed by such scanning electromagnetic sensors is frequently perturbed by noise or other electromagnetic signals. It is often difficult to distinguish between pertubations and the electromagnetic radiation that is desired to be sensed. For example, in the case of a direction finding electromagnetic sensor, received signal amplitude pertubations are often imposed upon the signal by movement of a source antenna. The signal provided to the sensor receiving equipment is usually modulated by both the source antenna movement and by the sensor movement of the scanning apparatus. Furthermore, the scanning modulation may be obscured by the original source modulation.

In a direction finder using a spinner antenna as the electromagnetic sensor, the spinner antenna receives side lobe signal energy. Thus, the spinner antenna is receiving electromagnetic radiation from an area defined by a main lobe and by side lobes of the antenna. If the direction finder is receiving energy from a searching or tracking radar system, the received signal is modulated by the movement of the transmitter antenna as the radar searches or tracks. Furthermore, it is often difficult to determine the center of the direction in which the spinner antenna is pointed if the spinner antenna beam width is large.

Several techniques have been developed to minimize the effects of the aforementioned pertubations which interfere with scanning electromagnetic sensors. Many systems employ cathode ray tubes as displays with medium to long persistance to provide a visual memory of previous scan patterns so that an operator can choose from among several scan patterns to determine which scan pattern is most acceptable. Also, scanning electromagnetic sensors using antennas often employ a technique for cancelling all signal energy received through antenna side lobes, thus removing this perturbing factor. Such latter systems are generally expensive to implement.

Thus, a need has arisen for an inexpensive system for reducing the negative effect of source modulation, sensor side lobe responses and other perturbing influences on signals detected by a scanning electromagnetic sensor. In particular, a need has arisen for processing equipment for use in scanning electromagnetic sensors to reduce the negative effects of the above described pertubations. The processing equipment should provide an estimate or best approximation of the electromagnetic phenomena to be sensed. The scan pattern estimate should be narrowed with respect to the sensed electromagnetic scan pattern and should reduce or substantially eliminate the side lobe responses of a scanning antenna.

SUMMARY OF INVENTION

In accordance with the present invention, a scan pattern estimator is provided for use in a scanning electromagnetic sensor system in which electromagnetic radiation is repetitively scanned and sensed for a plurality of scan cycles to produce data signals corresponding to the sensed electromagnetic radiation. The scan pattern estimator basically comprises a combiner and a delay unit. The combiner is responsive to the data signals to produce output signals. The delay unit receives the output signals from the combiner and produces delayed signals that correspond to the output signals delayed for a period of one scan cycle. The combiner receives and combines the delayed signals with the data signals to produce the output signals to correspond to a combination of the data signals and the output signals. The combination includes a component corresponding to a product of the data signals and the delayed signals. The output signals for an entire scan cycle represent a scan pattern estimate having reduced extraneous modulations and pertubations relative to sensed electromagnetic radiation.

In accordance with an embodiment of the present invention a scan pattern estimator is provided in a scanning electromagnetic sensor system. The electromagnetic sensor system includes an antenna that senses electromagnetic radiation through a scan cycle and includes a detection device for generating position signals indicating the position in the scan cycle that the antenna is sensing. A receiver produces data signals in response to the electromagnetic radiation received on the antenna. The data signals of each scan cycle constitute an input scan pattern.

The scan pattern estimator comprises basically a combiner and a delay unit. The combiner receives the input scan patterns and produces output scan patterns. The delay unit receives the output scan patterns and produces delayed scan patterns corresponding to the output scan patterns delayed for a period of one scan cycle. The combiner produces output scan patterns corresponding to a combination of the delayed scan patterns and the input scan patterns. This combination includes as a component thereof the product of the delayed scan patterns and the input scan patterns.

In accordance with this embodiment of the invention, the combiner comprises a start-up scaler, a summer, a delay unit, a continuous operation scaler, a multiplier and an automatic gain control. The start-up scaler receives the input scan patterns and produces start-up scaled scan patterns corresponding to the input scan patterns multiplied by a selectively variable first scaling factor. The summer receives the start-up scaled scan patterns and produces the output scan patterns. The output scan patterns are received by the delay unit from the summer, and delayed scan patterns are produced by the delay unit corresponding to the output scan patterns delayed for a period of one scan cycle.

A continuous operation scaling unit produces scaled delayed scan patterns corresponding to the delayed scan patterns multiplied by a selectively variable second scaling factor. Product scan patterns corresponding to the product of the scaled delayed scan patterns and the input scan patterns are produced by the multiplier.

An automatic gain control is responsive to the output scan pattern to produce a control signal for being applied to the start-up and continuous operation scalers for varying the first and second sealing factors. The start-up scaler is responsive to the control signal to produce the first scaling factor having a magnitude inversely proportional to the magnitude of a peak amplitude of the output scan patterns so that the start-up scaler transmits initial input scan patterns to initiate the operation of the scan pattern estimator and then reduces the first scaling factor to approach zero. The continuous operation scaler is responsive to the control signal to scale the magnitude of the delayed scan pattern to produce output scan patterns of the summer having a peak amplitude of approximately unity. The summer produces output scan patterns having approximately unity peak amplitudes and corresponding to the sum of the product scan patterns, the start-up scan patterns and the delayed scan patterns.

The scan pattern estimator provides the following effects beneficial to sensing and display of the electromagnetic radiation that is desired to be sensed:

(1) The amplitude and shape of the displayed scan pattern will be stabilized. Even though input scan patterns may vary in amplitude and shape from scan to scan, the scan pattern estimate will be relatively consistent and uniform.

(2) The scan pattern estimate will have a pattern mainlobe that is narrow relative to the mainlobe of received scan patterns.

(3) Sidelobe responses of the sensor or the antenna are reduced or substantially eliminated.

The first effect is an averaging effect resulting from producing a scan pattern estimate based on multiple input scan patterns. The second and third effects result from multiplying the input scan pattern by the scan pattern estimate of the prior scan cycle. The multiplication creates an exponential transfer function so that input values lower than the peak amplitude of the scan pattern are transferred at an exponentially lowered value. The peak amplitude of the scan pattern estimate is maintained at a unity value by an automatic gain control.

BRIEF DESCRIPTION OF THE DRAWINGS

The present invention may best be understood by reference to the following Detailed Description when considered in conjunction with the Drawings in which.

DETAILED DESCRIPTION

Figure 1:
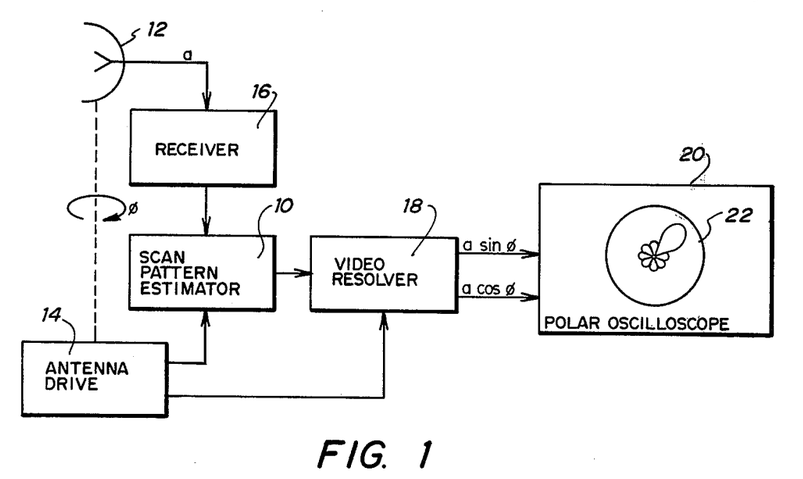
FIG. 1 is a block diagram of a spinner direction finding system employing a scan pattern estimator embodying the present invention.

Referring now to the drawings in which like reference characters designate like or corresponding parts throughout the several views, there is shown in FIG. 1 a spinner direction finding system including a scan pattern estimator 10 embodying the present invention. A spinner antenna 12 is mechanically connected to an antenna drive 14 for rotation through a 360° scan cycle. Spinner antenna 12 is conventionally designed to detect electromagnetic energy from the direction in which the antenna is pointed.

The signal detected by the antenna 12 is applied to a receiver 16 that processes the received signals. In the preferred embodiment, the receiver 16 amplifies the received signals and produces an input video signal in response thereto.

A scan cycle is defined by a complete 360° rotation of the spinner antenna 12. The signals received by the spinner antenna 12 in one scan cycle are collectively referred to herein as a scan pattern. The output of the scan pattern estimator 10 over a complete scan cycle is a scan pattern estimate that is applied to a video resolver 18. The scan pattern estimator 10 multiplies incoming signals from the receiver 16 by the output of the scan pattern estimator 10 delayed by one scan cycle to produce a component of the scan pattern estimator. The video resolver 18 drives a polar oscilloscope 20 to provide a visual respresentation of the scan pattern estimate which corresponds to the signals received on the spinner antenna 12.

The scan pattern estimator 10 and the video resolver 18 both receive position signals from the antenna drive 14 to indicate the position of the antenna 12 in a scan cycle. In this manner, the scan pattern estimator 10 and the video resolver 18 are synchronized with the motion of the spinner antenna 12. The scan pattern estimator 10 uses the position signals from antenna drive 14 to produce delayed signals corresponding to the output of the scan pattern estimator 10 for exactly one scan cycle and then to multiply the delayed signals by the input signals to the scan pattern estimator 10. The video resolver 20 is responsive to the position signals from antenna drive 14 to visually indicate on the polar oscilloscope 20 the position of the antenna 12 as signals are being received.

Figure 2:
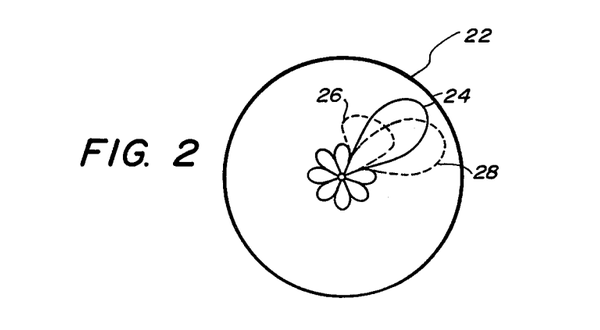
FIG. 2 represents a video display showing multiple perturbed scan patterns received by the system of FIG. 1.

FIG. 2 is a detailed view of a video screen 22 of the polar oscilloscope 20. The screen 22 shows an idealized display 24 of a received scan pattern that would be received on antenna 12 from a constant level signal from the same constant direction. Thus, display 24 represents the idealized area from which the antenna 12 is responsive to electromagnetic radiation. Displays 26 and 28 shown in dashed lines represent perturbed scan patterns that may actually be received on the antenna 12. By successively multiplying the input to scan pattern estimator 10 from the receiver 16 by the delayed output of the scan pattern estimator 10 and by adding this product to the delayed output of the scan pattern estimator, a scan pattern estimate results that more nearly approximates the idealized display 24. In this manner, the display on screen 22 provides a more accurate indication of the electromagnetic phenomena that is being sensed. The operation of the scan pattern estimator 10 is hereinafter fully described.

Figure 3:
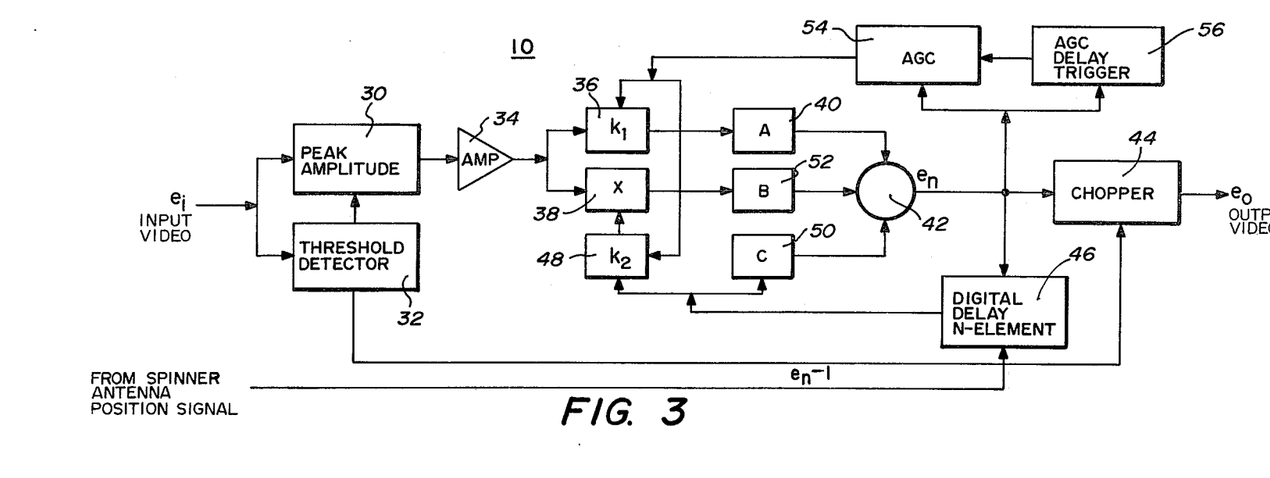
FIG. 3 is a block diagram of the scan pattern estimator.

Referring now to FIG. 3, there is shown a block diagram illustrating the scan pattern estimator 10 of FIG. 1. The input video signal from the receiver 16 (FIG. 1) is applied to a peak amplitude unit 30 and a threshold detector 32. When the input video signal reaches a predetermind threshold, the threshold detector enables the peak amplitude unit 30 to follow and retain the peak input video value occurring between successive position increments of the spinner antenna 12 (FIG. 1). For signal sampling purposes, the 360° of antenna rotation is divided into N increments and one sample of input video is taken for each increment of rotation. In the preferred embodiment N=1024. This sample of the peak input video is amplified by amplifier 34 and applied to a start-up scaling unit 36 and a multiplier 38. On the initial or start-up scan, the signal from amplifier 34 is passed through the scaling unit 36 which multiplies this signal by a variable scaling factor, $K_1$, and through a fixed ratio scaler 40 which multiplies the output of scaling unit 36 by a fixed ratio. The output of scaler 40 is applied to a summer 42.

The summer 42 produces an output signal that is applied to the chopper 44. The chopper 44 also receives a threshold signal from the threshold detector 32 which enables the chopper. In response to these two signals, the chopper 44 produces an output video signal. The chopper 44 can also be driven from a constant frequency source for use with continuous wave received signals and/or to provide a display whose intensity is independent of received signal pulse repetition frequency.

The output of the summer 42 is also applied to a digital delay unit 46 for a delay of one scan cycle. First, the input to the digital delay 46 from the summer 42 is converted from an analog to a digital signal. Then, in response to the position signals from the antenna drive 14 (FIG. 1) the digital input signal is stored for a period of one scan cycle and is read out of memory after exactly one scan cycle. The output of the delay unit 46 is converted back from a digital to an analog signal. In this way, the delay unit 46 delays the output signal from the summer 42 for a period precisely equal to one scan cycle of antenna 12.

The output of the delay unit 46 is applied to a fixed ratio scaler 50 and a selectively variable ratio scaling unit 48. The scaler 50 produces an output signal equal to the input to the scaler multiplied by a fixed ratio. The scaling unit 48 multiplies the output of the delay unit 46 by a variable scaling factor, $K_2$, and applies it as an input to the multiplier 38. The multiplier 38 provides an output signal corresponding to the product of the input video signal from amplifier 34 and the scaled delayed video signal from the delay unit 46. The output of the multiplier 38 is applied through a fixed ratio scaler 52 to the summer 42. Thus, the output of the summer 42 corresponds to the sum of the inputs from the fixed ratio scalers 40, 52 and 50.

The output of the summer 42 is also applied to an automatic gain control circuit 54 and to an automatic gain control delay trigger 56. The automatic gain control circuit 54 produces an output voltage proportional to the peak voltage of the output of summer 42 for an entire scan cycle. The automatic gain control delay trigger 56 produces an output that is applied to trigger the automatic gain control circuit 54 to enable the gain control 54 to modify its output. The purpose of the delay trigger 56 is to prevent the automatic gain control circuit 54 from changing its output during the presence of the peak voltage at the output of the summer 42. In this manner, the scan pattern produced by the summer 42 is undistorted for a period which includes the peak voltage of the scan pattern.

The output of the automatic gain control 54 is applied to the scaling units 36 and 48 to control the size of the variable scaling factors $K_1$ and $K_2$. During the first scan cycle of the operation of the scan pattern estimator, the output of the summer 42 is approximately zero, and the automatic gain control circuit 54 controls the scaling unit 36 to produce a scaling factor, $K_1$, of approximately unity. Thus, the scaling unit 36 passes the first scan pattern to the fixed ratio scaling unit 40. However, after the first scan cycle, the output of the summer 42 is greater than zero and the automatic gain control circuit 54 controls the scaling unit 36 to produce a scaling factor, $K_1$, that quickly approaches zero. Thus, the scaling unit 36 produces an approximate zero output voltage soon after the first scan cycle.

The scaling unit 48 produces a scaling factor, $K_2$, in response to the output signal from the automatic gain control circuit 54. $K_2$ is maintained at a value that produces a unity peak voltage at the output of the summer 42. Thus, if the peak output of the summer 42 begins to increase over a unity value, $K_2$ decreases. If the peak output of summer 42 drops below a unity value, the value of $K_2$ increases. If it were not for the scaling unit 48, the successive multiplication of the input video signal and the output signal from the delay unit 46 would result in a signal output having an exponentially increasing amplitude.

In this construction, the output video, $e_o$, of chopper 44 is equal to the input video signal, $e_i$, multiplied by the output, $e_{n-1}$, of the digital delay unit 46, multiplied by the scaling factor $K_2$ of the scaling unit 48, multiplied by the fixed ratio B of scaler 52; plus the output of the delay unit 46, $e_{n-1}$, multiplied by the fixed ratio, C, of the scaler 50; plus the input video signals, $e_i$, multiplied by the scaling factor, $K_1$, of the scaling unit 36 multiplied by the fixed ratio, A, of the scaler unit 40. Assuming that the fixed ratios A, B and C are equal to $\rho$ then the output video, $e_o$, may be represented as follows:

$$e_{on} = \rho k_1 e_i \sum_{j=0}^{n-1} \rho^j (k_2 e_i + 1)^j$$

$$\lim_{n \to \infty} e_{on} = \frac{\rho k_1 e_i}{1 - \rho(k_2 e_i + 1)}, \text{ for } |\rho(k_2 e_i + 1)| < 1$$

Figure 4A:
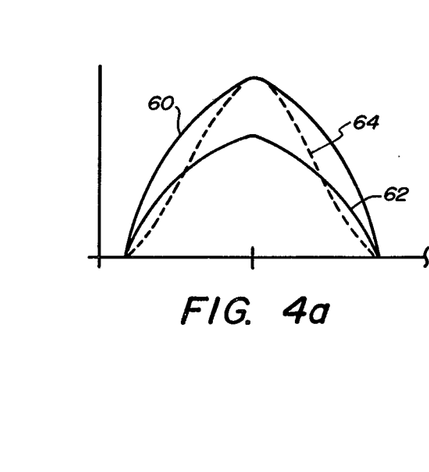
FIGS. 4a–c are graphs illustrating the successive outputs of the scan pattern estimator.
Figure 4B:
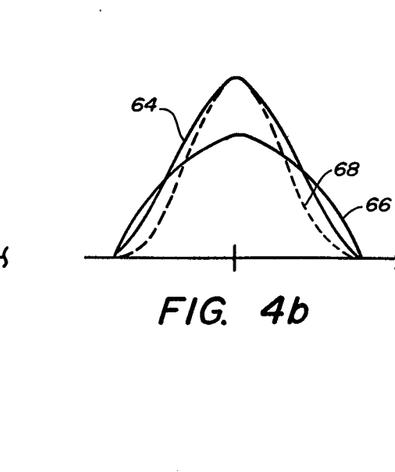
Figure 4C:
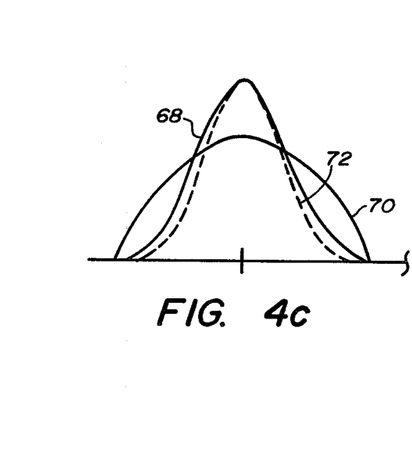

Referring now to FIGS. 4a, 4b and 4c, show a scan pattern estimate that is produced by the scan pattern estimator 10 for successive incoming scan patterns. In FIG. 4a, a first received scan pattern 60 is combined with a second received scan pattern 62 in accordance with the above described transfer function to produce a second scan pattern estimate 64. In FIG. 4b, the second scan pattern estimate 64 is combined with the third received scan pattern 66 to produce the third scan pattern estimate 68. In FIG. 4c, the third scan pattern estimate 68 is combined with the fourth received scan pattern 70 to produce the fourth scan pattern estimate 72.

From FIGS. 4a–c, it will be appreciated that the scan pattern estimates are generally narrower than the scan pattern actually received. By referring to FIGS. 4a–c and to the above described transfer function, it will also be appreciated that distortions and pertubations in received scan patterns will be deemphasized or partially cancelled by the scan pattern estimate so that the video output, $e_o$, of the chopper 44 represents a combination of a plurality of scan patterns.

Figure 5A:
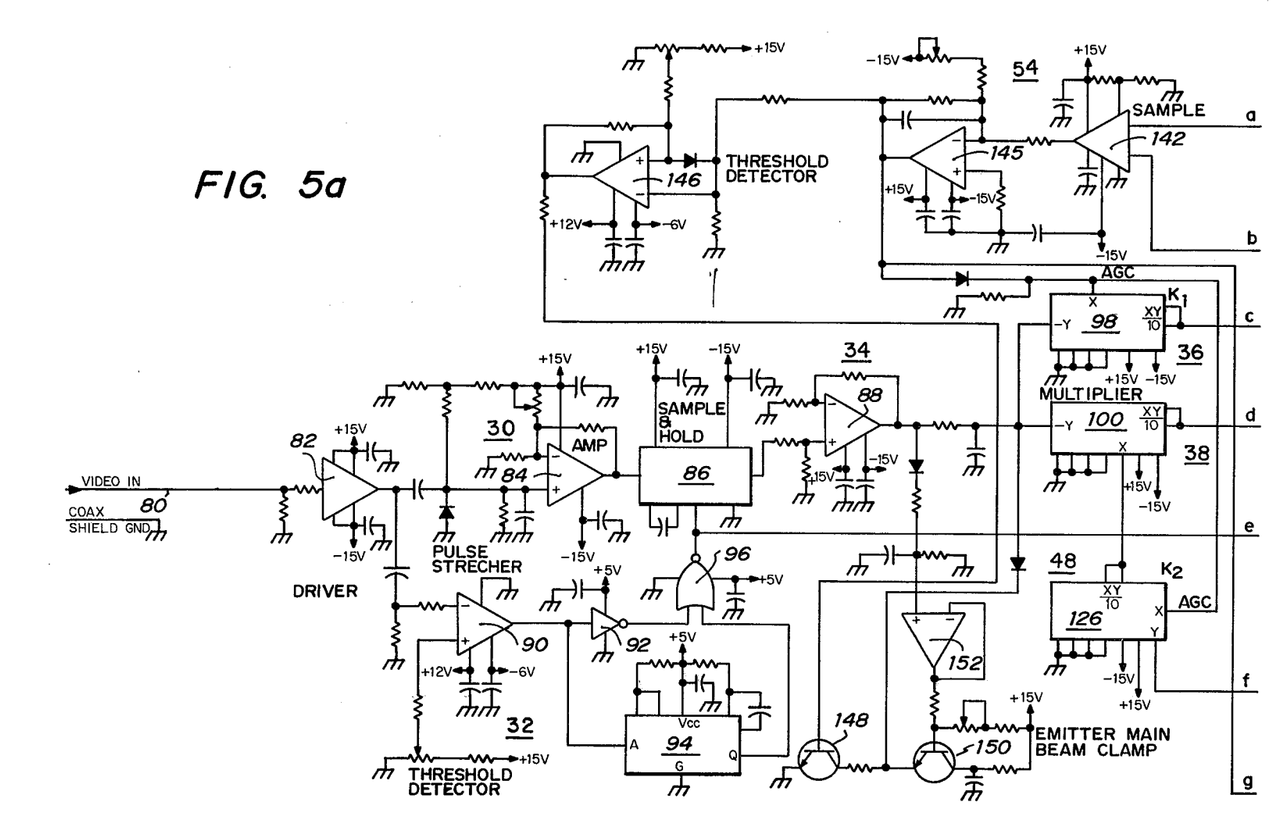
FIGS. 5a and 5b together form a circuit diagram of the scan pattern estimator shown in FIG. 3.
Figure 5B:
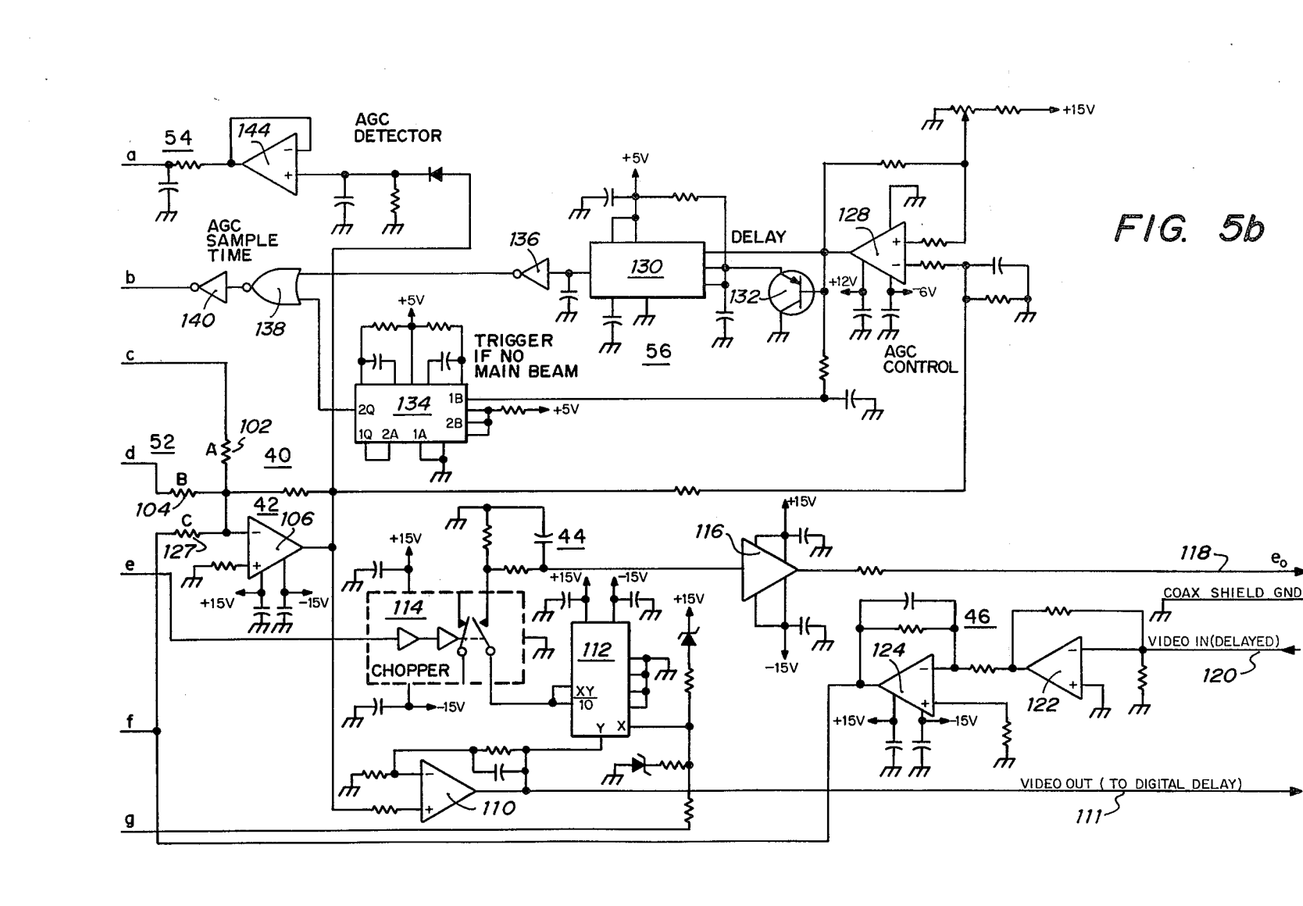

Referring now to FIGS. 5a and 5b, there is shown a detailed view of the scan pattern estimator illustrated by block diagram in FIG. 3. The digital delay unit 46 shown in FIG. 3 is not represented in FIGS. 5a and 5b, but is shown separately in FIG. 6.

As shown in FIGS. 5a and 5b, the input video signal is applied through a line 80 to an amplifier 82. The output of the amplifier 82 is applied through an amplifier 84 to the input of a sample and hold 86 whose output is applied to an input of amplifier 88.

The output of the amplifier 82 is also applied to a threshold detector 90 whose output is applied through an inverter 92 and through a dual one-shot 94 to the inputs of a NOR gate 96. The output of the NOR gate 96 is applied to the sample and hold 86 and to a chopper 114.

Elements 82, 84 and 86 in FIGS. 5a and 5b correspond to the peak amplitude unit 30 in FIG. 3. Amplifier 88 in FIGS. 5a and 5b corresponds to amplifier 34 in FIG. 3. The threshold detector 32 of FIG. 3 corresponds to elements 90, 92, 94 and 96 shown in FIGS. 5a and 5b.

The output of the amplifier 88 is applied to a scaling unit 98 and to a multiplier 100. The scaling unit 98 and the multiplier 100 correspond to the scaling unit 36, and the multiplier 38, respectively, shown in FIG. 3.

The output of the scaling unit 98 is applied through a resistor 102 to an input of an amplifier 106, and the output of the multiplier 100 is applied through a resistor 104 to the input of the amplifier 106. Resistors 102 and 104 and the amplifier 106 correspond to the fixed ratio scaling units 40 and 52 and the summer 42, respectively, shown in FIG. 3.

The output of amplifier 106 is applied through an amplifier 110 and through a scaler 112 to a video chopper 114. The output of amplifier 110 is also applied to a line 111 that is connected to delay unit 46 (FIG. 3). The scaler 112 and the chopper 114 are represented in FIG. 3 by the chopper 44.

The output of the chopper 114 is applied to an amplifier 116. The output of the amplifier 116 provides an output video signal on line 118. A delayed video signal is provided from the digital delay unit 46 (FIG. 3) on line 120. The delayed video signal is applied through an amplifier 122 and through an amplifier 124 to the input of a scaler 126. The scaler 126 corresponds to the scaling unit 48 shown in FIG. 3. The output of the scaler 126 is input to the multiplier 100.

The output of amplifier 124 is also applied through a resistor 127 to the input of the amplifier 106. The resistor 127 corresponds to the fixed ratio scaling unit 50 of FIG. 3.

The output of the amplifier 106 is also applied to the input of a comparator 128. The output of comparator 128 is applied to an input of a timer 130 and to a transistor 132 whose output is also applied to an input of the timer 130. Timer 130 provides a trigger pulse to discharge the automatic gain control 54 (FIG. 3) if the scan pattern does not include a main beam (a peak amplitude of a predetermined level for a desired period of time). The output of the timer 130 is applied through an inverter 136 to a NOR gate 138. The output of the amplifier 128 is also applied to a delay trigger 134 whose purpose is to provide a delayed trigger signal. The output of the delayed trigger 134 is applied to the other input of the NOR gate 138 whose output is applied to an inverter 140. The elements 128, 130, 132, 134, 136, 138 and 140 shown in FIGS. 5a and 5b correspond to the automatic gain control delay trigger 56 shown in FIG. 3.

The output of the inverter 140 is applied to trigger the Sample and Hold 142. The other input of the Sample and Hold 142 is supplied by an amplifier 144 whose input is connected to the output of the amplifier 106 via a peak detector. The output of the Sample and Hold 142 is applied to another amplifier 145 whose output constitutes the automatic gain control signal. The elements 142, 144 and 145 of FIGS. 5a and 5b constitute the automatic gain control circuit 54 shown in FIG. 3.

The output of the amplifier 145 is applied to the scaling unit 98 and to the scaling unit 126 to control their respective scaling factors in the manner previously described. The output of the amplifier 145 is also applied to the scaling unit 112 to control the magnitude of the signal received by the chopper 114 from the amplifier 110.

The output of the amplifier 145 is also applied to a comparator 146 that functions as a threshold detector. The output of comparator 146 is applied to a transistor 148 that is interconnected with a transistor 150 and an amplifier 152. One input of the amplifier 152 is connected to the output of the amplifier 88. The output of amplifier 88 is also interconnected between transistors 148 and 150. The elements 148, 150 and 152 function as an emitter main beam clamp.

By comparing FIGS. 3 and 5a and 5b, it will be appreciated that FIG. 3 is a somewhat simplified block diagram of the circuits shown in FIGS. 5a and 5b. In FIG. 3, certain control lines and elements were eliminated to emphasize the primary operation and function of the present invention. However, the control lines and elements omitted in FIG. 3 have been shown and described in FIGS. 5a and 5b.

Figure 6:
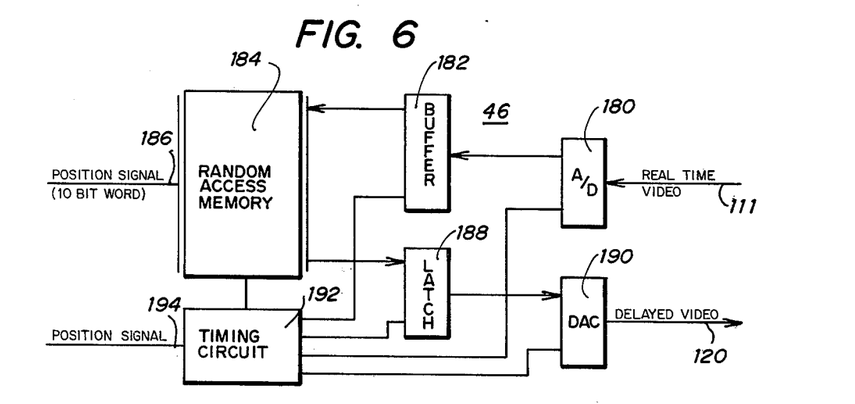
FIG. 6 is a block diagram of the digital delay unit shown in FIG. 3.

In FIG. 6, a block diagram of the delay unit 46 of FIG. 3 is shown. The real time video signal on line 111 is applied to analog to digital converter 180 that converts the amplitude of the video signal into an 8 bit word. The 8 bit word from the converter 180 is transferred through a buffer 182 to a random access memory 184. A digital word corresponding to the amplitude of the video signal delayed by one scan cycle is read from the memory 184 into the latch 188, and this word is then converted into the delayed video signal by the digital to analog converter 190. The delayed video signal is applied through line 120 to the circuit shown in FIGS. 5a and 5b.

In the preferred embodiment, the random access memory 184 has at least 1024 memory locations that are 8 bits in length. The random access memory 184 may be implemented using two rams. The buffer 182 may be a hex tri-state buffer and a latch 188 may be a hex D latch. The converter 180 may be A/D converter and the converter 190 may be D/A converter. It will be understood, however, that any suitable device may be substituted for the parts listed in the Parts Table.

The position signal on line 186 provides an address for the random access memory 184 to select a particular memory location for reading and for being written into. The position signal, in the preferred embodiment, is a 10 bit word designating one of the 1024 memory locations in the random access memory. When a particular memory location is selected, the timing circuit 192 causes the contents of that memory location to be read into the latch 188. The information read into the latch 188 corresponds to the real time video signal delayed by one scan cycle.

After a particular memory location has been read out of the random access memory 184, the word contained in the buffer 182 is read into the same memory location. After the reading and writing operations are completed, the position signal from line 186 selects the next memory location for reading and being written into.

Thus, it will be appreciated that the 360° rotation of the antenna is broken into 1024 angular locations, and the video signal at each such location is read into the random access memory 184. The position signal sequentially addresses each of the 1024 memory locations during each scan cycle to read out a delayed signal and to store the real time video signal.

The timing of the data flow through elements 180, 182, 184, 188 and 190 is controlled by the timing circuit 192 in a conventional manner. The timing circuit is synchronized with the movement of the antenna 12 (FIG. 1) by the position signals received on line 194.

ity of scan cycles to produce data signals corresponding to the sensed electromagnetic radiation, said scan pattern estimator comprising:

combining means responsive to the data signals for producing output signals;

delay means for receiving the output data signals from the combining means and producing delayed signals corresponding to the output signals delayed for a period of one scan cycle; and said combining means including means for receiving the data signals and the delayed signals and generating an output varying as the product of the data signals of each scan cycle multiplied by the output signals of the immediately previous scan cycle, and means for summing the product output of the means for receiving with the delayed signals to generate output signals for an entire scan cycle representing a scan pattern estimate with reduced extraneous modulation and pertubations relative to sensed electromagnetic radiation.

2. The scan pattern estimator of claim 1 wherein said combining means comprises:

at least one continuous operation scaling unit for receiving the delayed signals and for multiplying the delayed signals by a variable scaling factor to produce scaled delayed signals;

a multiplier for multiplying the data signals by the scaled delayed signals to produce product signals; and output means responsive to the product signals for producing the output signals, the output signals for a scan cycle representing a scan pattern estimate with reduced extraneous modulation and pertubations relative to sensed electromagnetic radiation.

3. The scan pattern estimator of claim 2 wherein the output means comprises an amplifier having an input connected through a first resistor to receive the product signals and connected through a second resistor to receive the delayed signals for producing the output sig-

PART NUMBER TABLE

| DESIGNATOR | FUNCTION | PART NUMBER | MANUFACTURER |
| --- | --- | --- | --- |
| 80 | Relay | PRME 1A00SC | C. P. Clare |
| 82,116 | Buffer Amp | LH0002CH | Natl. Semiconductor |
| 84 | Amp | HA1-2055-5 | Harris Corp. |
| 86 | S/H | SHM-2 | DATEL |
| 88,152,106, 110,122,124 | Amp | HA1-2655-5 | Harris Corp. |
| 90,146 | Comparator | TL810CP | Texas Instruments |
| 92,136 | Inverter | SN7404N | Texas Instruments |
| 94 | Monostable Multi- vibrator (dual) One Shot | SN74123N | Texas Instruments |
| 96 | Nor Gate | SN7402N | Texas Instruments |
| 114 | Analog Switch (Chopper) | TL604CP | Texas Instruments |
| 98,100,126,112 | Multiplier | 4205J | Burr Brown |
| 108,128 | Dual Comparator | TL820CN | Texas Instruments |
| 130 | Timer | NE555V | Signetics |
| 132 | Transistor | 2n2906 | Texas Instruments |
| 134 | Dual One Shot | SN74L5221N | |
| 148,150 | Transistor | 2N2221 | Texas Instruments |
| 142 | Sample & Hold | SHM-LM-2 | DATEL |
| 144,145 | Dual Amp | MC1458P | Motorola |
| 184 | Ram | P2114 | Intel |
| 182 | Tri-State Buffer | SN74LS367N | Texas Instruments |
| 188 | D-Latch | SN74LS174N | Texas Instruments |
| 180 | A/D | ADCEH8B1 | DATEL |
| 190 | DAC | DACIC8BC | DATEL |

Although a particular embodiment of the present invention has been described in the foregoing detailed description, it will be understood that the present invention is capable of numerous rearrangements, modifications or substitutions of parts without departing from the spirit of the invention.

I claim:

1. A scan pattern estimator for use in a scanning electromagnetic sensor system in which electromagnetic radiation is repetitively scanned and sensed for a pluralnals to include a component corresponding to the sum of the product signals and the delayed signals.

4. The scan pattern estimator of claim 3 wherein said combining means further comprises:
a start-up scaling unit having an input connected to receive the data signals for multiplying the data signals by a selectively variable scaling factor to produce scaled start-up signals;
a resistor connected to receive the scaled start-up signals and connected to said input of said amplifier; and
said amplifier being operable to produce the output signals in response to the scaled start-up signals.

5. The scan pattern estimator of claim 2 further comprising:
an automatic gain control for receiving the output signals and producing a control signal proportional to a peak amplitude level of the output signals in each scan cycle; and
said continuous operation scaling unit being operable to vary the scaling factor in response to the control signal to maintain the peak amplitude of the output signals in the scan cycles at approximately a unity level.

6. The scan pattern estimator of claim 5 further comprising a delayed trigger responsive to the output signals to trigger the automatic gain control to vary the control signal after a preselected time delay to prevent the automatic gain control from distorting the shape of a scan pattern.

7. The scan pattern estimator of claim 1 including automatic gain control means receiving the output data signals from the combining means and producing variable scaling factors applied to said combining means to scale the delayed signals by the scaling factors.

8. A scan pattern estimator for use in a scanning electromagnetic sensor system in which electromagnetic radiation is repetitively scanned and sensed for a plurality of scan cycles to produce data signals corresponding to the sensed electromagnetic radiation, said scan pattern estimator comprising:
combining means responsive to the data signals for producing output signals; and
delay means for receiving the output data signals from the combining means and producing delayed signals corresponding to the output signals delayed for a period of one scan cycle;
said combining means comprises:
first scaling means for receiving the data signals and for multiplying the data signals by a first variable scaling factor to produce scaled data signals;
second scaling means for receiving the delayed signals and for multiplying the delayed signals by a second variable scaling factor to produce scaled delayed signals;
a multiplier for multiplying the data signals by the scaled delayed signals to produce a product signal; and
output means for producing the output signals to include a component corresponding to the sum of the product signals and the scaled data signals.

9. The scan pattern estimator of claim 8 further comprising:
an automatic gain control for receiving the output signals and producing a control signal proportionally corresponding to a peak amplitude level in each scan cycle of the output signals;
said first scaling unit receiving the control signal and being operable to vary the first variable scaling factor in response thereto for reducing the scaled data signals to approach zero after the first scan cycle; and
a second scaling unit receiving the control signal and being operable in response thereto to vary the second variable scaling factor to maintain the peak amplitude of the output signals in each scan cycle at approximately a unity level.

10. The scan pattern estimator of claim 9 further comprising a delayed trigger responsive to the output signals to trigger the automatic gain control to vary the control signal after a preselected time delay to prevent the automatic gain control from distorting the shape of a scan pattern.

11. The scan pattern estimator of claim 8 wherein said output means comprises an amplifier having an input connected through a first resistor to receive the scaled data signals and connected through a second resistor to receive the scaled delayed signals for producing the output signals.

12. The scan pattern estimator of claim 8 wherein the output means further comprises a third resistor connected to receive the delayed signals and connected to said input of said amplifier, said amplifier being operable to produce the output signals to correspond to the sum of the scaled data signals, the product signals and the delayed signals with said signals being first multiplied by fixed ratios proportional to the resistance of said first, second and third resistors, respectively.

13. The scan pattern estimator of claim 8 wherein said output means comprises:
a first transfer means for receiving the scaled data signals and producing first transfer signals corresponding to the scaled data signals multiplied by a first fixed ratio;
a second transfer means for receiving the product signals and producing second transfer signals corresponding to the product signals multiplied by a second fixed ratio;
a third transfer means for receiving the delayed signals and producing a third transfer signal corresponding to the delayed signals multiplied by a third fixed ratio; and
a summing means for receiving the first, second and third transfer signals and for producing the output signals corresponding to the sum of the first, second and third transfer signals.

14. A scan pattern estimator for use in a scanning electromagnetic sensor system in which electromagnetic radiation is repetitively scanned and sensed for a plurality of scan cycles to produce data signals corresponding to the sensed electromagnetic radiation, said scan pattern estimator comprising:
combining means responsive to the data signals for producing output signals; and
delay means for receiving the output data signals from the combining means and producing delayed signals corresponding to the output signals delayed for a period of one scan cycle;
said combining means comprising:
a first input for receiving the data signals;
a second input for receiving the delayed signals; and
a summing means responsive to signals received on said first and second inputs for producing output signals including a product of the data signals and the delayed signals.

15. In a scanning electromagnetic sensor system having an antenna scanning through a scan cycle for receiving electromagnetic radiation, a detection device for generating position signals corresponding to the position in the scan cycle being sensed by the antenna, and a receiver for producing data signals in response to the electromagnetic radiation received on the antenna, the data signals of each scan cycle constituting an input scan pattern, a scan pattern estimator comprising:
   a combiner for receiving the input scan patterns and producing output scan patterns in response thereto; and
   a delay means for receiving the output scan patterns and producing delayed scan patterns corresponding to the output scan patterns delayed for a period of one scan cycle;
   said combiner comprising:
   a multiplier responsive to the input scan patterns and the delayed scan patterns for producing product scan patterns corresponding to the product of the input scan patterns and the delayed scan patterns; and
   summing means responsive to the product scan patterns and the first input scan pattern for producing a first output scan pattern corresponding to the first input scan pattern and for producing successive output scan patterns the include the product scan patterns.

16. The scan pattern estimator of claim 15 further comprising a summing means for producing output scan patterns including a component corresponding to the sum of the product scan patterns and the delayed scan patterns.

17. In a scanning electromagnetic sensor system having an antenna scanning through a scan cycle for receiving electromagnetic radiation, a detection device for generating position signals corresponding to the position in the scan cycle being sensed by the antenna, and a receiver for producing data signals in response to the electromagnetic radiation received on the antenna, the data signals of each scan cycle constituting an input scan pattern, a scan pattern estimator comprising:
   a combiner for receiving the input scan patterns and producing output scan patterns in response thereto; and
   a delay means for receiving the output scan patterns and producing delayed scan patterns corresponding to the output scan patterns delayed for a period of one scan cycle;
   said combiner comprises:
   at least one scaling means for receiving the delayed scan patterns and for producing scaled delayed scan patterns corresponding to the delayed scan patterns multiplied by a selectively variable scaling factor;
   a multiplier for producing product scan patterns corresponding to the product of the input scan patterns and the scaled delayed scan patterns; and
   means for summing the product scan patterns with the delayed scan patterns to produce output scan patterns.

18. The scan pattern estimator of claim 17 wherein said summing means includes means for receiving the first input scan pattern, the product scan patterns and the delayed scan patterns.

19. The scan pattern estimator of claim 17 further comprising an automatic gain control responsive to the output scan patterns for producing a control signal, said scaling means being responsive to said control signal to vary said scaling factor to maintain the peak amplitude of the output scan pattern at a substantially constant level.

20. The scan pattern estimator of claim 19 wherein said automatic gain control includes a delay trigger for delaying the variation of said control signal for a selected time period after the occurrence of the peak amplitude in the output scan patterns.

21. In a scanning electromagnetic sensor system having an antenna scanning through a scan cycle for receiving electromagnetic radiation, a detection device for generating position signals corresponding to the position in the scan cycle being sensed by the antenna, and a receiver for producing data signals in response to the electromagnetic radiation received on the antenna, the data signals of each scan cycle constituting an input scan pattern, a scan pattern estimator comprising:
   a combiner for receiving the input scan patterns and producing output scan patterns in response thereto; and
   a delay means for receiving the output scan patterns and producing delayed scan patterns corresponding to the output scan patterns delayed for a period of one scan cycle;
   said combiner comprises:
   a start-up scaling means for receiving the input scan patterns and producing a start-up scaled scan pattern corresponding to the input scan pattern multiplied by a selectively variable first scaling factor;
   a summing means for receiving the start-up scaled scan pattern and for producing the output scan patterns;
   said delay means receiving the output scan patterns from the summing means and producing delayed scan patterns corresponding to the output scan patterns delayed for a period of one scan cycle;
   a continuous operation scaling means for producing scaled delayed scan patterns corresponding to the delayed scan patterns multiplied by a selectively variable second scaling factor;
   a multiplier for producing product scan patterns corresponding to the product of the scaled delayed scan patterns and the input scan patterns;
   an automatic gain control responsive to the output scan pattern for producing a control signal for being applied to the start-up and continuous operations scaling means for varying the first and second scaling factors;
   said start-up scaling means being responsive to the control signal to produce the first scaling factor having a magnitude inversely proportional to the magnitude of a peak amplitude of the output scan patterns so that said start-up scaling means transmits initial input scan patterns to begin operation of the scan pattern estimator and after the initial scan patterns changes the first scaling factor to approach zero in response to the control signal;
   said continuous operation scaling means being responsive to the control signal to scale the magnitude of the delayed scan pattern to produce output scan patterns having a peak amplitude of approximately unity; and
   said summing means producing output scan patterns proportional to the sum of the product scan patterns, the start-up scan patterns and the delayed scan patterns.

22. In a scanning electromagnetic sensor system having an antenna scanning through a scan cycle for receiving electromagnetic radiation, a detection device for generating position signals corresponding to the position in the scan cycle being sensed by the antenna, and a receiver for producing data signals in response to the electromagnetic radiation received on the antenna, the data signals of each scan cycle constituting an input scan pattern, a scan pattern estimator comprising:
   a combiner for receiving the input scan patterns and producing output scan patterns in response thereto;
   a delay means for receiving the output scan patterns and producing delayed scan patterns corresponding to the output scan patterns delayed for a period of one scan cycle;
   automatic gain control means receiving the output scan patterns and producing a variable scaling factor varying with the amplitude of the output scan pattern about a present level; and
   said combiner producing a first output scan pattern corresponding to the first input scan pattern multiplied by the scaling factor and successively producing output scan patterns subsequent to the first output scan pattern corresponding to a combination of delayed scan patterns multiplied by the scaling factors and the input scan patterns including a product of the scaled delayed scan patterns and the input scan patterns.

23. The scan pattern estimator of claim 22 wherein said combiner includes scaling means and said automatic gain control means includes means for producing a decreasing scaling factor for the first input scan pattern and means for producing an increasing scale factor for a decrease in the amplitude of an output scan pattern and a decreasing scale factor for increase in the amplitude of an output scan pattern to maintain the amplitude of the output scan pattern at a preselected level.

* * * * *